US010479492B2

(12) United States Patent
Honnorat et al.

(10) Patent No.: US 10,479,492 B2
(45) Date of Patent: Nov. 19, 2019

(54) ROTOR AND AN AIRCRAFT PROVIDED WITH SUCH A ROTOR

(71) Applicant: AIRBUS HELICOPTERS, Marignane (FR)

(72) Inventors: Olivier Honnorat, Aix en Provence (FR); Jean-Pierre Jalaguier, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 261 days.

(21) Appl. No.: 15/633,942

(22) Filed: Jun. 27, 2017

(65) Prior Publication Data

US 2018/0002006 A1    Jan. 4, 2018

(30) Foreign Application Priority Data

Jun. 29, 2016  (FR) .................................... 16 01027

(51) Int. Cl.
| | |
|---|---|
| *B64C 27/635* | (2006.01) |
| *B64C 27/605* | (2006.01) |
| *B64C 27/51* | (2006.01) |

(52) U.S. Cl.
CPC ............ *B64C 27/605* (2013.01); *B64C 27/51* (2013.01); *B64C 27/635* (2013.01)

(58) Field of Classification Search
CPC ..... B64C 27/605; B64C 27/51; B64C 27/635; B64C 27/54; B64C 27/59
USPC ........................................................ 416/106
See application file for complete search history.

(56) References Cited

U.S. PATENT DOCUMENTS

| | | | | |
|---|---|---|---|---|
| 2,494,985 A | * | 1/1950 | Campbell ............... | B64C 27/51 188/268 |
| 2,568,214 A | * | 9/1951 | Bennett .................. | B64C 27/51 416/140 |
| 2,604,953 A | * | 7/1952 | Campbell ............... | B64C 27/51 188/286 |

(Continued)

FOREIGN PATENT DOCUMENTS

| | | | | |
|---|---|---|---|---|
| CA | 2520778 A1 | * | 3/2006 | ............. B64C 27/32 |
| CA | 2822073 A1 | * | 2/2014 | .......... B64C 27/605 |

(Continued)

OTHER PUBLICATIONS

French Search Report for French Application No. FR 1601027, Completed by the French Patent Office, dated Feb. 27, 2017, 7 Pages.

(Continued)

*Primary Examiner* — Justin D Seabe
*Assistant Examiner* — Brian Christopher Delrue
(74) *Attorney, Agent, or Firm* — Brooks Kushman P.C.

(57) ABSTRACT

A rotor comprising a hub and a plurality of lift assemblies. Each lift assembly is connected to two adjacent lift assemblies respectively by a first damper and a second damper. The first damper is hinged to a lift assembly about a first axis, and the second damper is hinged to said lift assembly about a second axis. A first plane contains a lead-lag axis of the lift assembly and orthogonally to the pitch axis of the lift assembly. The first axis is situated in a volume lying between the first plane and an axis of rotation of the rotor, the second axis being positioned outside said volume.

18 Claims, 2 Drawing Sheets

(56) References Cited

U.S. PATENT DOCUMENTS

| | | | | |
|---|---|---|---|---|
| 2,616,510 A * | 11/1952 | Rzeczycki | B64C 27/51 188/312 |
| 2,640,553 A * | 6/1953 | Hafner | B64C 27/51 416/106 |
| 2,640,554 A * | 6/1953 | Campbell | B64C 27/54 416/106 |
| 3,310,119 A * | 3/1967 | Watson | B64C 27/327 416/103 |
| 3,361,216 A * | 1/1968 | Walker | B64C 11/008 188/298 |
| 3,484,173 A * | 12/1969 | Rybicki | B64C 27/51 188/282.8 |
| 3,762,834 A * | 10/1973 | Bourquardez | B64C 27/33 416/134 A |
| 3,807,897 A * | 4/1974 | Lucien | B64C 27/33 416/140 |
| 4,105,365 A * | 8/1978 | Ferris | B64C 27/51 416/107 |
| 4,342,540 A * | 8/1982 | Lovera | B64C 27/35 416/107 |
| 4,568,245 A * | 2/1986 | Hibyan | B64C 27/32 416/134 A |
| 4,915,585 A * | 4/1990 | Guimbal | B64C 27/51 416/107 |
| 5,219,430 A * | 6/1993 | Antoine | B64C 27/51 188/282.1 |
| 5,267,833 A | 12/1993 | Mouille | |
| 5,630,970 A | 6/1997 | Certain | |
| 5,769,606 A * | 6/1998 | Mondet | B64D 15/12 244/134 D |
| 6,036,442 A * | 3/2000 | Certain | B64C 27/50 416/143 |
| 6,092,795 A * | 7/2000 | McGuire | F16F 13/24 188/322.21 |
| 6,140,720 A * | 10/2000 | Certain | B64C 27/35 310/43 |
| 6,200,097 B1 * | 3/2001 | Mouille | B64C 27/32 416/107 |
| 6,447,249 B2 * | 9/2002 | Potdevin | B64C 27/50 416/143 |
| 6,910,865 B2 * | 6/2005 | Pancotti | B64C 27/32 416/134 A |
| 8,167,561 B2 * | 5/2012 | Jones | B64C 27/51 244/131 |
| 8,496,435 B2 * | 7/2013 | Nannoni | B64C 27/32 416/134 A |
| 8,632,308 B2 * | 1/2014 | Russell | B64C 27/35 416/145 |
| 8,695,917 B2 * | 4/2014 | Cranga | B64C 27/001 188/379 |
| 9,284,051 B2 * | 3/2016 | Amari | B64C 27/51 |
| 9,457,898 B2 * | 10/2016 | Russell | B64C 27/51 |
| 9,637,228 B2 * | 5/2017 | Mazet | B64C 27/54 |
| 9,765,825 B2 * | 9/2017 | Stamps | B64D 35/04 |
| 9,879,753 B2 * | 1/2018 | McGill | B64C 27/39 |
| 2003/0146343 A1 * | 8/2003 | Zoppitelli | B64C 27/35 244/17.11 |
| 2006/0222505 A1 * | 10/2006 | Sehgal | B64C 27/001 416/244 R |
| 2008/0159862 A1 * | 7/2008 | Beroul | B64C 27/35 416/140 |
| 2009/0110555 A1 * | 4/2009 | Jones | B64C 27/51 416/140 |
| 2010/0215496 A1 * | 8/2010 | Nannoni | B64C 27/32 416/135 |
| 2011/0243734 A1 * | 10/2011 | Schmaling | B64C 27/322 416/107 |
| 2014/0178199 A1 * | 6/2014 | Wiinikka | B64C 27/51 416/1 |
| 2014/0299709 A1 | 10/2014 | D'Anna | |
| 2015/0251753 A1 * | 9/2015 | Jarrett | B64C 27/35 416/104 |
| 2017/0320567 A1 * | 11/2017 | Miller | B64C 27/33 |
| 2018/0327089 A1 * | 11/2018 | Shimek | B64C 27/473 |
| 2019/0002085 A1 * | 1/2019 | Choi | F16F 15/121 |
| 2019/0100300 A1 * | 4/2019 | Haldeman | B64C 27/001 |

FOREIGN PATENT DOCUMENTS

| | | | | |
|---|---|---|---|---|
| CA | 2983143 A1 * | 6/2018 | | B64C 27/33 |
| DE | 1456105 | 11/1968 | | |
| EP | 0742144 A1 * | 11/1996 | | B64C 27/51 |
| EP | 2947007 A1 * | 11/2015 | | B64C 27/54 |
| EP | 3446973 A1 * | 2/2019 | | B64C 27/605 |
| EP | 3450308 A1 * | 3/2019 | | B64C 11/32 |
| FR | 2630703 | 11/1989 | | |
| FR | 2671049 | 7/1992 | | |
| FR | 2760425 | 9/1998 | | |
| FR | 3020341 | 10/2015 | | |
| GB | 787848 | 12/1957 | | |
| JP | H0253698 | 2/1990 | | |
| JP | 2004067053 A | 3/2004 | | |
| JP | 2010195391 A | 9/2010 | | |
| WO | WO-2007067260 A2 * | 6/2007 | | B64C 27/605 |

OTHER PUBLICATIONS

Japanese Office Action for JP2017-111316, dated Jul. 30, 2018, 2 pages.

* cited by examiner

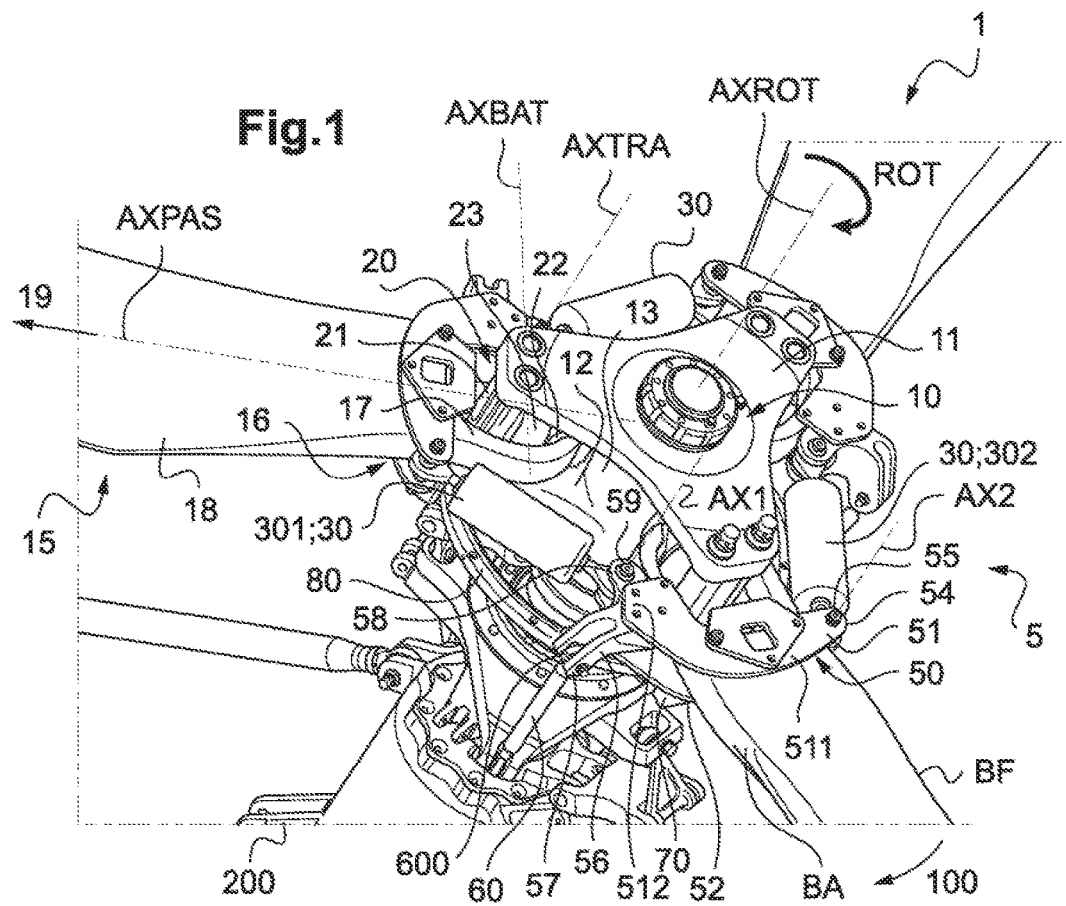

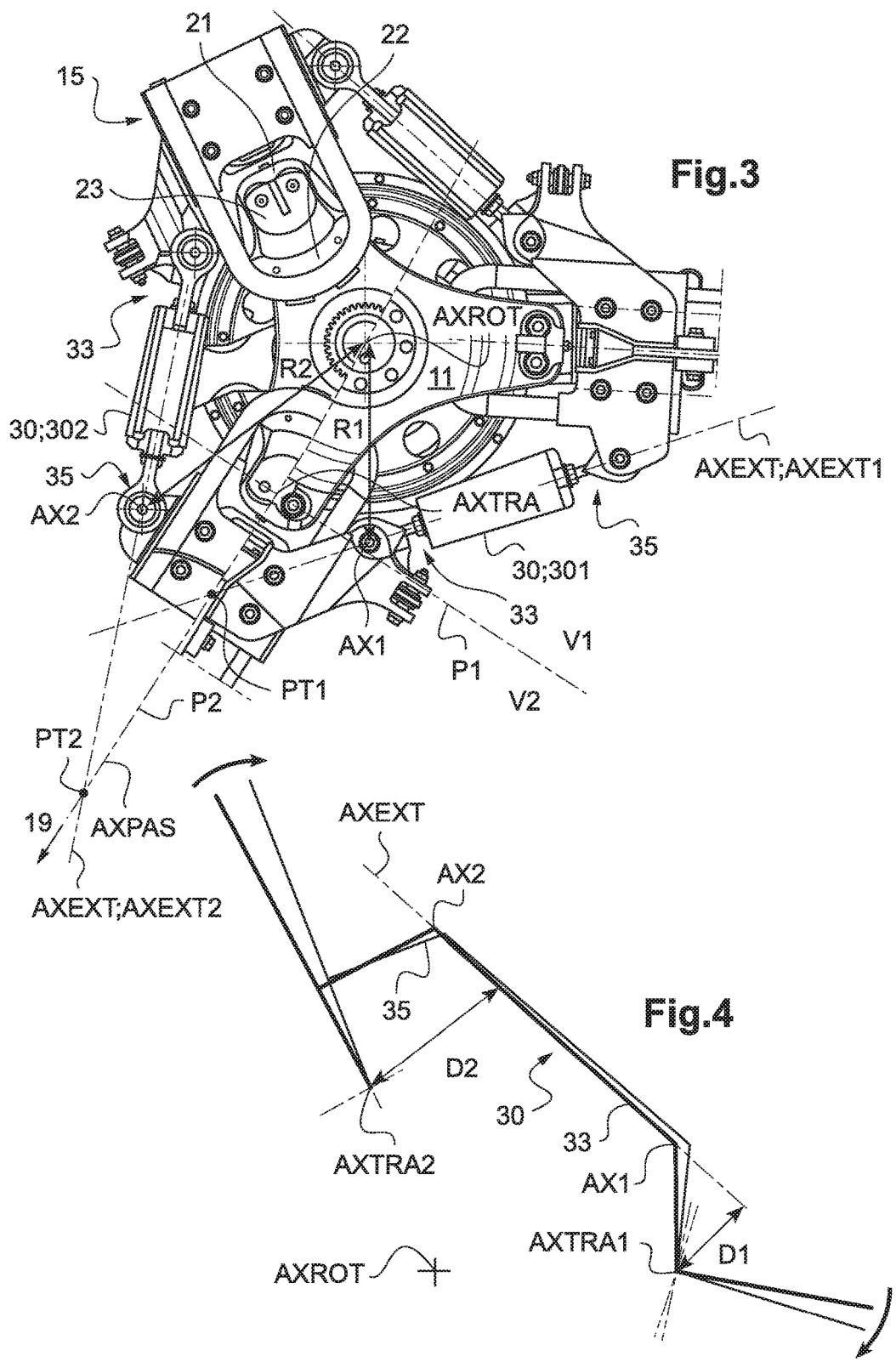

ROTOR AND AN AIRCRAFT PROVIDED WITH SUCH A ROTOR

CROSS-REFERENCE TO RELATED APPLICATIONS

This application claims priority to French patent application No. FR 16 01027 filed on Jun. 29, 2016, the disclosure of which is incorporated in its entirety by reference herein.

BACKGROUND OF THE INVENTION

(1) Field of the Invention

The present invention relates to a rotor and to an aircraft provided with such a rotor.

The invention is thus situated in the technical field of aircraft rotors, and in particular rotors contributing to lift and/or propulsion of the aircraft.

(2) Description of Related Art

In particular, a helicopter includes at least one rotor contributing to the lift and indeed to the propulsion of the aircraft.

The rotor comprises a hub that is set into rotation by a power plant. In addition, the rotor comprises a plurality of lift assemblies each driven in rotation by the hub.

Each lift assembly is fastened to the hub by a mobility and retention member. Such a mobility and retention member provides a lift assembly with freedom to move in rotation relative to the hub about a flapping axis, a lead-lag axis, and a pitch axis. By way of example, a mobility and retention member may take the form of a spherical abutment, or of a flexible blade.

In addition, a lift assembly comprises a lift member and a root connected to the hub.

The root of a lift assembly is a connection member that enables the lift assembly to be connected to a mobility and retention member of the rotor. The root may be in the form of a mechanical part that is independent from the lift member, or of a mechanical part that represents a portion of the lift member. By way of example, the root of a lift assembly may take the form of a cuff fastened to the lift member, or of a cuff forming an integral part of the lift member.

The term "blade" sometimes designates the lift assembly when the root is an integral part of the lift member, or it may designate the lift member when the root is not a part of the lift member.

In addition, a rotor may include abutments, e.g. for limiting a flapping movement towards the ground of a lift assembly when the aircraft is stationary on the ground, or indeed abutments for limiting upwards flapping of a lift assembly in flight.

In addition, a rotor may include dampers.

Document FR 2 630 703 describes a rotor provided with a plurality of lift assemblies connected to a hub.

In addition, each lift assembly is connected to an adjacent lift assembly by a damper. For that reason, such a damper is called an "inter-blade damper".

Each lift assembly is thus hinged to two dampers that are respectively connected to two adjacent lift assemblies.

The two dampers of a single lift assembly are fastened to the lift assembly respectively via two fastener pins. Those two fastener pins are positioned on the pitch axis of the lift assembly. Furthermore, a geometrical plane lies between those two fastener pins and the axis of rotation of the rotor, which geometrical plane contains the lead-lag axis of the lift assembly and is orthogonal to the pitch axis of the lift assembly.

Furthermore, the rotor is provided with lead-lag abutment devices for limiting a collective lead-lag movement of the blades.

By way of example, when the rotation of the rotor is braked, the lift assemblies all perform a lead-lag movement in the direction of rotation of the rotor. Lead-lag movements are limited by the lead-lag abutment device.

A rotor provided with dampers extending between two lift assemblies is found to be advantageous, in particular when the lift assemblies are all performing the same flapping movement. If assemblies perform flapping movements that are different, e.g. during a phenomenon of air resonance, the dampers are stressed by being shortened or lengthened.

However, that architecture leads to the presence of lead-lag abutments for limiting a collective lead-lag movement of the lift assemblies.

Document FR 2 671 049 describes a rotor provided with a plurality of lift assemblies and of inter-blade dampers.

Each lift assembly comprises a root provided with a loop surrounding a mobility and retention member of the spherical abutment type.

In addition, each lift assembly includes a mechanical member provided with two plates that are parallel to each other. Two dampers of a lift assembly are fastened to those plates.

Document US 2014/299 709 describes a rotor provided with a hub and with lift assemblies. Each lift assembly is hinged to a damper, that damper also being hinged to the hub and not to another lift assembly.

Such dampers are sometimes known as "blade-hub" dampers.

A rotor provided with blade-hub dampers might possibly not have lead-lag abutments. However, unlike a rotor provided with inter-blade dampers, the dampers are always stressed when a lift assembly performs a flapping movement.

Furthermore, a rotor provided with blade-hub dampers requires fastener systems to be put in place on the hub in order to hinge the dampers to the hub. Such fastener systems are often found to be complex, expensive, and difficult to incorporate.

Documents FR 2 760 425, FR 3 020 341, GB 787 848, and DE 1 456 105 are also known.

BRIEF SUMMARY OF THE INVENTION

The present invention thus aims to provide an innovative rotor, possibly tending to present optimized weight and compactness.

The invention thus provides a rotor designed to contribute at least in part to the lift and/or to the propulsion of an aircraft, the rotor comprising a hub and a plurality of lift assemblies that are movable together in rotation about an axis of rotation of the rotor, each lift assembly comprising a root and a lift member that extends in the span direction from the root towards an end, the root being attached to the hub by a mobility and retention member and being secured to the lift member, each mobility and retention member conferring on the associated lift assembly a degree of freedom to move relative to the hub about at least a lead-lag axis and a pitch axis, each lift assembly being positioned circumferentially between two adjacent lift assemblies, each lift assembly being connected to the two adjacent lift assemblies respectively by a first damper and by a second damper.

For each lift assembly:

a first plane contains the lead-lag axis of the lift assembly and is orthogonal to the pitch axis of the lift assembly;

the first damper is hinged to the lift assembly at least about a first axis parallel to the lead-lag axis of the lift assembly; and the second damper is hinged to the lift assembly at least about a second axis parallel to the lead-lag axis of the lift assembly, the first axis being situated in a volume lying between the first plane and the axis of rotation of the rotor, the second axis being positioned outside said volume.

The term "movable together in rotation" means that the lift assemblies and the hub perform rotary motion together about the axis of rotation of the rotor when the rotor is driven in rotation.

The term "being positioned circumferentially" means that each lift assembly is preceded by an upstream lift assembly and followed by a downstream lift assembly, where "upstream" and "downstream" are relative to the direction of rotation of the rotor about the axis of rotation.

The term "lift member" designates a portion of the lift assembly presenting airfoil profiles.

The rotor is provided with dampers in particular for damping lead-lag movements of the lift assemblies. The dampers are of the inter-blade damper type, each connecting together two lift assemblies that are adjacent to each other.

Relative to a given lift assembly, the term "first" damper designates the damper hinged to the given lift assembly about the corresponding first axis. In addition, the term "second" damper designates the damper hinged to the given lift assembly about the corresponding second axis.

Furthermore, each damper is hinged about a said first axis to a lift assembly, and about a said second axis to another lift assembly.

With known architectures, abutments need to be used in order to limit any lead-lag movement of the lift assemblies that is collective, i.e. when all of the lift assemblies perform the same lead-lag movement substantially simultaneously.

In contrast, the invention may make such a lead-lag abutment device pointless.

To this end, both dampers connected to a lift assembly are hinged to the lift assembly by hinges. These hinges confer at least one degree of freedom in rotation to the two dampers respectively about first and second axes that are both parallel to the lead-lag axis of the lift assembly.

By offsetting the first and second axes of the lift assembly in the span direction on opposite sides of the first plane containing the lead-lag axis of the lift assembly, the invention makes it possible to guarantee that any lead-lag movement of a lift assembly leads to the dampers being compressed or extended.

During a movement in rotation of a lift assembly about its lead-lag axis, one of said first and second axes of the lift assembly tends to move towards the axis of rotation of the rotor, and the other axis tends to move away therefrom. Under such circumstances, the particular positioning of the first and second axes tends to lead to stressing the dampers, even when the lift assemblies perform respective common movements in rotation about their respective lead-lag axes.

With this mounting, any lead-lag movement of a given lift assembly is accompanied by a traction or compression force exerted on the dampers hinged to the given lift assembly, which makes it possible to block the lead-lag movement of the lift assemblies, in particular during braking of the rotor. By way of example, an angular movement of 5° of a lift assembly about its lead-lag axis may generate a static force in the dampers of 700 decanewtons (daN) that is sufficient for stopping the lead-lag movement of the lift assembly while stopping the rotor.

Consequently, the dampers should be dimensioned in order to enable the lead-lag movement of the lift assemblies to be limited. These dampers may thus make any lead-lag abutment device pointless. Under such circumstances, the rotor of the invention can present the advantages of a rotor provided with inter-blade dampers, but without presenting the usual drawbacks.

In addition, the rotor is provided with inter-blade dampers, and is therefore not provided with attachment means used in the prior art to fasten a damper to a hub in blade-hub dampers. The rotor can thus be simplified relative to a conventional blade-hub rotor, while presenting the advantages of such a rotor.

The invention can thus lead to reducing the number of parts of a rotor so as to limit its cost and weight, e.g. by avoiding, the use of said attachment means or of a lead-lag abutment device.

The invention can also lead to minimizing the bulk of a rotor. In particular, the hub may be very compact. Such a hub can be streamlined more effectively and with less weight by means of a top cap.

Furthermore, a rotor provided with a compact hub can make it possible to use lift assemblies having airfoil profiles that are radially close to the hub.

On a helicopter, phenomena of exhaust gas from an engine recirculating can lead to power losses that are penalizing for engine performance, in particular while hovering. These recirculation phenomena are sometimes caused by the near absence of any movement of air at the hub during hovering. Under such circumstances, some of the exhaust gas may be sucked back into the engine. By using a compact rotor, the airfoil zone of the lift assemblies is close to the axis of rotation of the rotor and can therefore tend to cause air to move in the proximity of the axis of rotation, thereby limiting said recirculation phenomenon.

The rotor of the invention may further include one or more of the following characteristics.

Thus, the first and second axes of a lift assembly may be located on opposite sides of the pitch axis of the lift assembly.

This arrangement can enhance the operation of the system.

In another aspect, said first axis may be situated beside the leading edge of the lift assembly, the second axis being situated beside the trailing edge of the lift assembly.

In another aspect, the first and second axes of a lift assembly may be respectively spaced apart from the axis of rotation of the rotor by a first radius and by a second radius, the second radius being greater than the first radius.

In another aspect, each damper may extend from a first end zone towards a second end zone along a longitudinally extending axis, the first end zone being hinged to a lift assembly, referred to as a "first" lift assembly, about the first axis of the first lift assembly, the second end zone being hinged to a lift assembly, referred to as a "second" lift assembly, about the second axis of the second lift assembly, a first distance lying orthogonally between said longitudinally extending axis and a lead-lag axis, referred to as a "first" lead-lag axis of the first lift assembly, a second distance lying orthogonally between said longitudinally extending axis and a lead-lag axis, referred to as a "second"

lead-lag axis of the second lift assembly, and the quotient of the first distance divided by the second distance is less than or equal to 0.6.

The shorter distance must therefore lie in the range 0 to a maximum of 0.6 times the longer distance.

By means of this location, in the event of the lift assemblies moving synchronously, the two points for attaching a damper to two lift assemblies move towards each other or apart depending on the direction of rotation of the lift assemblies. The dampers are thus stressed and this stress can be sufficient to omit any lead-lag abutment.

In another aspect, for each lift assembly, the first damper connected to the lift assembly extends along a longitudinally extending axis, referred to as a "first" longitudinally extending axis, and the second damper extends along a longitudinally extending axis, referred to as a "second" longitudinally extending axis, the first longitudinally extending axis intersecting a second plane at a first point, the second longitudinally extending axis intersecting the second plane at a second point, the second plane containing said pitch axis of the lift assembly and being orthogonal to the first plane of the lift assembly, the first point being closer to the axis of rotation than the second point.

In another aspect, the rotor need not have an abutment for limiting a lead-lag movement of the lift assemblies.

In another aspect, at least one damper may be hinged to a lift assembly by a ball joint, the ball joint comprising a ball through which a pin passes, the pin extending along the first axis or the second axis.

The term "ball" designates a member that may indeed be spherical, or that may be spherical in part only, e.g. including flattened areas.

Pins may thus extend along all of the first and second axes.

In another variant, each pin is orthogonal to a first or second axis.

Regardless of the variant, a ball joint confers freedom of movement in rotation about three axes of rotation, and therefore not about either of the above-mentioned first and second axes in particular.

In addition, the root of a lift assembly may include a shackle fastened to a mobility and retention member and a fitting fastened to the lift assembly between said shackle and said end, said fitting comprising two L-shaped plates, each L-shaped plate presenting an orifice through which said second axis passes.

In addition, the two plates may hold between them an intermediate connection member, the intermediate member including a fork connected to a pitch rod and at least one orifice through which the first axis passes.

Two dampers and a pitch rod are fastened to a common fitting of a lift assembly. In addition, the two dampers are fastened transversely, i.e. in the chord direction of the lift assembly, on opposite sides of the lift assembly.

This mounting with attachment of the dampers on opposite sides of the lift assembly makes it possible to ensure that the forces exerted on the dampers are taken up by the fitting and are not transmitted to the hub.

In addition, the control forces transmitted by a pitch rod pass via the fitting, and not via the shackle, and this tends to reduce the strength needed by the shackle.

In another aspect, the fitting may carry a low stud abutment facing a low ring abutment for limiting a flapping movement of the lift assembly in a direction.

The ring abutment may be attached to a rotor mast that is secured to the hub in order to drive the rotor in rotation about the axis of rotation, for example. Reference may be made to the literature in order to obtain information on the ring abutments. In particular, the teaching of document FR 2 671 049 may be applied. The ring abutment is thus carried by clamps.

Such an arrangement makes it possible to obtain a relatively compact shackle, and therefore a relatively compact rotor.

Conversely, an arrangement of the stud abutment at the shackle would lead to the twisting moments exerted on the lift assembly being transmitted to the shackle. The shackle is initially dimensioned to withstand the centrifugal forces exerted on the lift assembly. The shackle would then need to be overdimensioned in order to resist such moments insofar as these moments tend to be more penalizing than the centrifugal forces.

In another aspect, said hub may comprise two plates, the root of each lift assembly comprising a shackle extending in part between said plates, the shackle being hinged to the two plates by a mobility and retention member.

The hub is of the double-plate type. The hub thus comprises two plates, the shackles of the assemblies being arranged between the two plates. By way of example, the plates are fastened to each other using conventional systems. In alternative manner, the plates may be portions of a single mechanical part.

Such a hub can tend to optimize mounting and dismantling of the lift assemblies.

For each lift assembly, a mobility and retention member may be arranged between the two plates, the mobility and retention member comprising an outer strength member fastened to the two plates and an inner strength member fastened to said shackle, said inner strength member being arranged radially between said axis of rotation and said outer strength member.

By way of example, each plate may be polygonal in shape, each outer strength member being located at a vertex of said polygon. Alternatively, each plate may for example be star shaped, each outer strength member being located at the end of a branch of the star.

This arrangement tends to facilitate mounting and dismantling of the lift elements. It suffices to dismantle the outer strength members and a pitch rod in order to be able to dismantle a lift assembly.

In addition to a rotor, the invention provides an aircraft including said rotor.

By way of example, the aircraft is a rotorcraft, and possibly a helicopter.

BRIEF DESCRIPTION OF THE DRAWINGS

The invention and its advantages appear in greater detail in the context of the description below with examples given by way of illustration and with reference to the accompanying figures, in which:

FIG. 1 is a three-dimensional view of a rotor of an aircraft of the invention;

FIG. 2 is a section view of a damper fastened to two lift assemblies;

FIG. 3 is a diagram showing a plan view of a rotor of the invention; and

FIG. 4 is a diagram explaining stress of a damper.

Elements present in more than one of the figures are given the same references in each of them.

DETAILED DESCRIPTION OF THE INVENTION

FIG. 1 shows a rotor 5 of an aircraft 1. The rotor 5 contributes at least in part to the lift or to the propulsion of the aircraft 1, or even to the lift and to the propulsion of the aircraft 1.

The rotor 5 is set into motion by a power transmission train 200. Such a power transmission train 200 comprises in particular a rotor mast constrained to rotate with the rotor 5 about an axis referred to as the "axis of rotation AXROT".

The rotor 5 comprises a hub 10 that carries a plurality of lift assemblies 15, and by way of example at least three lift assemblies. The hub and the lift assemblies therefore rotate together about the axis of rotation AXROT under drive from the power transmission train 200.

The hub 10 may comprise two plates 11, 12 that are parallel to each other and substantially orthogonal to the axis of rotation AXROT. These plates are connected to each other by conventional members, such as a central shaft 13. An empty space lies between the two plates 11, 12 in elevation. Each plate may present the shape of a polygon or of a star, for example.

In addition, each lift assembly 15 extends substantially radially in the span direction from the hub 10 to an end 19. In particular, each lift assembly 15 comprises a root 16 that is attached to the hub 10 and a lift member 18. Said lift member 18 extends from the root 16 to the end 19.

The root 16 may be fastened to the lift member 15 by conventional means, or it may be a part constituting said lift member. Furthermore, the root 16 may comprise a loop referred to as a "shackle 17". The shackle 17 may be C-shaped in order to define an opening in the root.

Under such circumstances, each lift assembly 15 is attached to the hub 10 by a mobility and retention member 20. Such a mobility and retention member 20 confers a degree of freedom on the lift assembly fastened to said mobility and retention member 20 to move relative to the hub, about at least one of a lead-lag axis AXTRA and of a pitch axis AXPAS and possibly even of a flapping axis AXBAT.

The pitch axis AXPAS extends substantially in the span direction of the lift assembly and is orthogonal to the axis of rotation AXROT. Furthermore, the lead-lag axis is substantially parallel to the axis of rotation AXROT. Finally, the flapping axis is substantially orthogonal to the lead-lag axis AXTRA and to the pitch axis AXPAS.

By way of example, each mobility and retention member 20 is arranged between the two plates 11, 12.

A mobility and retention member 20 may take the form of a spherical abutment. Under such circumstances, the mobility and retention member 20 is provided with an outer strength member 21 connected to an inner strength member 22 via a central zone 23. By way of example, such a central zone 23 comprises an elastomer member that is provided with alternating flexible elastomer layers and rigid layers, possibly made of metal.

The outer strength member 21 is fastened to the two plates 11, 12, by extending in elevation from a plate referred to as a "bottom plate 12" towards a plate referred to as a "top plate 11". By way of example, the outer strength member 21 is screw-fastened to each plate.

However, the inner strength member 22 is fastened to said shackle 17, and is not fastened to the hub. By way of example, the inner strength member 22 is fastened, possibly by screws, to an arch of the shackle.

The inner strength member 22 together with the outer strength member 21 and the central zone 23 are thus located in part in the opening defined by the shackle. In addition, the inner strength member 22 is arranged radially between the axis of rotation AXROT and the outer strength member 21.

In addition, the lift assemblies 15 are distributed circumferentially around the hub 10. By way of example, the lift assemblies 15 are uniformly distributed circumferentially around the hub 10.

Under such circumstances, each lift assembly 15 is circumferentially arranged between two other lift assemblies. Relative to the direction of rotation ROT of the rotor, a lift assembly is located between an upstream adjacent lift assembly and a downstream adjacent lift assembly.

In addition, the rotor 5 comprises a plurality of dampers 30. In particular, the rotor 5 comprises one damper 30 per lift assembly 15.

Each damper 30 extends between two adjacent lift assemblies.

In the example of FIG. 1, the rotor has three lift assemblies. Under such circumstances, one damper is hinged to a first lift assembly and to a second lift assembly, another damper is hinged to the second lift assembly and a third lift assembly, and a last damper is hinged to the third lift assembly and to the first lift assembly.

Each lift assembly 15 is thus hinged to a first damper 301 about a first axis AX1 and to a second damper 302 about a second axis AX2. Consequently, each damper is hinged to a lift assembly about the first axis of said lift assembly, and to another lift assembly about the second axis of said other lift assembly.

The first and second axes AX1, AX2 associated with a lift assembly are parallel to the lead-lag axis of said lift assembly.

The first axis AX1 may be situated beside the leading edge BA of the lift assembly 15. Under such circumstances, the second axis AX2 is situated beside the trailing edge BF of said same lift assembly 15.

In order to be fastened to two dampers, each lift assembly 15 may include a fitting 50.

The fitting 50 of a lift assembly makes it possible to hinge to said lift assembly a first damper 301 about a first axis AX1 and a second damper 302 about a second axis AX2.

By way of example, the fitting 50 comprises two plates 51, 52. The two plates are located in elevation on either side of the root 16 of the lift assembly. In addition, the two plates are arranged in the span direction of the lift assembly between the shackle 17 and the end 19 of said lift assembly.

The two plates 51, 52 may be L-shaped, presenting a long branch 511 and a short branch 512. The long branch 511 extends substantially parallel to the flapping axis of the lift assembly, while the short branch 512 extends substantially parallel to the pitch axis of the lift assembly.

The two plates 51, 52 are fastened to the lift assembly by example by screw-fastening means 54 passing through the thickness of the root.

Each plate 51, 52 presents an orifice 55 through which the second axis AX2 passes. The orifice 55 may be made in a free end of the long branch 511. The two plates thus form together a fork suitable for being hinged to a damper.

In addition, both plates 51, 52 may be fastened using conventional means, such as screw-fastening means, to an intermediate connection member 56. By way of example, the intermediate member 56 is fastened to free ends of the short branch 512 of the plates 51, 52.

The intermediate member 56 may comprise a fork 57 connected to a pitch rod 60. By way of example, the fork is a first fork 57 provided with two cheeks hinged to a lug 600 of a pitch rod 60.

In addition, the intermediate member 56 may include at least one orifice 59 through which the first axis AX1 passes. By way of example the intermediate member comprises a second fork 58 provided with two cheeks. Each of the two cheeks of the second fork is provided with such an orifice 59, and they are hinged to a damper.

In another aspect, the fitting 50 may be fastened using conventional means to a low stud abutment 70.

The low stud abutment extends in elevation in the opening defined by the shackle of the associated lift assembly, by projecting in elevation out of said opening. In addition, the low stud abutment is facing a low ring abutment 80 in order to limit flapping movement of the lift assembly 15 in a direction 100.

With reference to FIG. 2, a damper 30 may be fastened to a fitting by a ball joint 40. Under such circumstances, such a ball joint 40 comprises a ball 41 and a pin 42 passing through said ball 41. The pin 42 is thus located along a first or second axis as a function of its position. Each ball joint confers at least one degree of freedom in rotation to a damper about the axis along which the pin of the ball joint extends.

By way of example, the damper 30 extends longitudinally along a longitudinally extending axis AXEXT from a first end zone 33 to a second end zone 35. The first end zone 33 thus includes a cage 330 surrounding in part a ball 41 through which a pin passes and extends along the first axis AX1. In addition, the second end zone 35 thus includes a cage surrounding in part a ball 41 through which a pin passes extending along the second axis AX2.

In addition, the first end zone 33 may be secured to a first movable member 34 of the damper 30, and the second end zone 35 may be secured to a second movable member 36 of the damper 30. By way of example, damper elements are located between the first movable member 34 and the second movable member 36. In the FIG. 3 embodiment each movable member may take the form of a cylindrical strength member, the damper element comprising at least one elastomer ring.

Nonetheless, other types of dampers may be envisaged, such as hydraulic dampers for example.

In another aspect, and with reference to FIG. 3, for each lift assembly, a first geometrical plane P1 is orthogonal to the pitch axis AXPAS of said lift assembly and contains the lead-lag axis AXTRA of said lift assembly.

Under such circumstances, the first plane P1 defines two volumes in three-dimensional space. More particularly, the first plane P1 separates a volume V1 referred to as the "first" volume and containing the axis of rotation AXROT from a volume referred to as the "second" volume V2 and containing the end 19 of the lift assembly.

Under such circumstances, the first axis AX1 along which a first damper 301 is fastened to the lift assembly is situated in the first volume V1 containing the axis of rotation AXROT of the rotor. However, the second axis AX2, along which a second damper 302 is fastened to the lift assembly, is situated in the second volume V2. The second axis AX2 is positioned between the first plane P1 and a plane parallel to the first plane P1 and passing via the end 19 of the lift assembly.

In addition, FIG. 3 shows the fact that the first and second axes AX1, AX2 of a lift assembly 15 are respectively spaced apart from the axis of rotation AXROT by a first radius R1 and by a second radius R2. The second radius R2 is thus greater than the first radius R1.

In addition, for each lift assembly, the first damper 301 hinged to the lift assembly about a first axis AX1 extends along a longitudinally extending axis AXEXT referred to as the "first" longitudinally extending axis AXEXT1. The second damper 302 hinged to the lift assembly about a second axis AX2 extends along a longitudinally extending axis AXEXT referred to as the "second" longitudinally extending axis AXEXT2.

Under such circumstances, the first longitudinally extending axis AXEXT1 passes through a second plane P2 at a first point PT1, the second plane P2 containing the pitch axis AXPAS and the lead-lag axis AXTRA of the observed lift assembly and being orthogonal to the first plane P1.

In addition, the second longitudinally extending axis AXEXT2 passes through the second plane P2 at a second point PT2.

Under such circumstances, the first point PT1 is closer to the axis of rotation AXROT than the second point PT2.

Furthermore, the first and second axes AX1, AX2 are not contained in the second plane P2. On the contrary, the first and second axes AX1, AX2 associated with a lift assembly 15 are located on opposite sides of the pitch axis AXPAS of said lift assembly 15.

In addition, and with reference to FIG. 4, each damper 30 therefore extends between a first end zone hinged about a first axis AX1 of a first lift assembly and a second end zone hinged about a second axis AX2 of a second lift assembly.

A first distance D1 lies orthogonally between the longitudinally extending axis AXEXT and a lead-lag axis AXTRA referred to as a "first" lead-lag axis AXTRA1 of the first lift assembly. This first distance D1 thus represents the smallest distance lying orthogonally between the longitudinally extending axis AXEXT and the first lead-lag axis AXTRA1.

A second distance D2 lies orthogonally between the longitudinally extending axis AXEXT and a lead-lag axis AXTRA referred to as a "second" lead-lag axis AXTRA2 of the second lift assembly. This second distance D2 thus represents the smallest distance lying orthogonally between the longitudinally extending axis AXEXT and the second lead-lag axis AXTRA2.

Under such circumstances, the quotient of the first distance D1 divided by the second distance D2 is less than or equal to 0.6.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A rotor designed to contribute at least in part to the lift and/or to the propulsion of an aircraft, the rotor comprising a hub and at least three lift assemblies that are movable together in rotation about an axis of rotation of the rotor, each lift assembly comprising a root and a lift member that extends in the span direction from the root towards an end, the root being attached to the hub by a mobility and retention member and being secured to the lift member, each mobility and retention member conferring on each lift assembly a degree of freedom to move relative to the hub about at least a lead-lag axis and a pitch axis, each lift assembly being positioned circumferentially between two adjacent lift assemblies, each lift assembly being connected to the two adjacent lift assemblies respectively by a first damper and by a second damper, and for each lift assembly:
- a first plane contains the lead-lag axis and is orthogonal to the pitch axis of the lift assembly;
- the first damper is hinged to the lift assembly at least about a first axis parallel to the lead-lag axis of the lift assembly;
- the second damper is hinged to the lift assembly at least about a second axis parallel to the lead-lag axis of the lift assembly;
- the first axis is situated in a volume lying between the first plane of the lift assembly and the axis of rotation, the second axis being positioned outside the volume; and
- the root includes a shackle fastened to the mobility and retention member and a fitting fastened to the lift assembly between the shackle and the end, the fitting comprising two L-shaped plates, each L-shaped plate presenting an orifice through which the second axis passes, the two L-shaped plates hold between them an intermediate connection member, and the intermediate member including a fork connected to a pitch rod and at least one orifice through which the first axis passes.

2. The rotor according to claim 1, wherein for each lift assembly the first axis and the second axis of the lift assembly are located on opposite sides of the pitch axis of the lift assembly.

3. The rotor according to claim 1, wherein for each lift assembly the first axis and the second axis of the lift assembly are respectively spaced apart from the axis of rotation by a first radius and by a second radius, the second radius being greater than the first radius.

4. The rotor according to claim 1, wherein each damper extends from a first end zone towards a second end zone along a longitudinally extending axis, the first end zone being hinged to a first one of the lift assemblies about the first axis of the first one of the lift assemblies, the second end zone being hinged to a second one of the lift assemblies about the second axis of the second one of the lift assemblies, a first distance lying orthogonally between the longitudinally extending axis and a lead-lag axis of the first one of the lift assemblies, a second distance lying orthogonally between the longitudinally extending axis and a lead-lag axis of the second one of the lift assemblies, and the quotient of the first distance divided by the second distance is less than or equal to 0.6.

5. The rotor according to claim 1, wherein, for each lift assembly, the first damper extends along a first longitudinally extending axis and the second damper extends along a second longitudinally extending axis, the first longitudinally extending axis intersecting a second plane at a first point, the second longitudinally extending axis intersecting the second plane at a second point, the second plane containing the pitch axis and being orthogonal to the first plane, the first point being closer to the axis of rotation than the second point.

6. The rotor according to claim 1, wherein the rotor does not have an abutment for limiting a lead-lag movement of the lift assemblies.

7. The rotor according to claim 1, wherein at least one damper is hinged to a lift assembly by a ball joint, the ball joint comprising a ball through which a pin passes, the pin extending along the first axis or the second axis.

8. The rotor according to claim 1, wherein for each lift assembly the fitting is configured to limit a flapping movement of the lift assembly.

9. The rotor according to claim 1, wherein for each lift assembly the first axis is situated beside the leading edge of the lift assembly, the second axis being situated beside the trailing edge of the lift assembly.

10. The rotor according to claim 1, wherein the hub comprises two plates, the root of each lift assembly comprising a shackle extending in part between the plates, the shackle being hinged to the two plates by said mobility and retention member.

11. The rotor according to claim 10, wherein for each lift assembly, a mobility and retention member is arranged between the two plates, the mobility and retention member comprising an outer strength member fastened to the two plates and an inner strength member fastened to the shackle, the inner strength member being arranged radially between the axis of rotation and the outer strength member.

12. An aircraft, wherein the aircraft includes the rotor according to claim 1.

13. A rotor designed to contribute at least in part to the lift and/or to the propulsion of an aircraft, the rotor comprising a hub and at least three lift assemblies that are movable together in rotation about an axis of rotation of the rotor, each lift assembly comprising a root and a lift member that extends in the span direction from the root towards an end, the root being attached to the hub by a mobility and retention member and being secured to the lift member, each mobility and retention member conferring on each lift assembly a degree of freedom to move relative to the hub about at least a lead-lag axis and a pitch axis, each lift assembly being positioned circumferentially between two adjacent lift assemblies, each lift assembly being connected to the two adjacent lift assemblies respectively by a first damper and by a second damper, and for each lift assembly:
- a first plane contains the lead-lag axis and is orthogonal to the pitch axis of the lift assembly;
- the first damper is hinged to the lift assembly at least about a first axis parallel to the lead-lag axis of the lift assembly;
- the second damper is hinged to the lift assembly at least about a second axis parallel to the lead-lag axis of the lift assembly;
- the first axis is situated in a volume lying between the first plane of the lift assembly and the axis of rotation, the second axis being positioned outside the volume; and
- the root includes a shackle fastened to the mobility and retention member and a fitting fastened to the lift assembly between the shackle and the end, the fitting comprising two L-shaped plates, each L-shaped plate presenting an orifice through which the second axis passes, and the fitting is configured to limit a flapping movement of the lift assembly.

14. The rotor according to claim 13, wherein for each lift assembly the two L-shaped plates hold between them an intermediate connection member, the intermediate member including a fork connected to a pitch rod and at least one orifice through which the first axis passes.

15. The rotor according to claim 13, wherein the hub comprises two plates, the root of each lift assembly comprising a shackle extending in part between the plates, the shackle being hinged to the two plates by the mobility and retention member.

16. The rotor according to claim 15, wherein for each lift assembly, a mobility and retention member is arranged between the two plates, the mobility and retention member comprising an outer strength member fastened to the two plates and an inner strength member fastened to the shackle, the inner strength member being arranged radially between the axis of rotation and the outer strength member.

17. A rotor designed to contribute at least in part to the lift and/or to the propulsion of an aircraft, the rotor comprising a hub and at least three lift assemblies that are movable together in rotation about an axis of rotation of the rotor, each lift assembly comprising a root and a lift member that extends in the span direction from the root towards an end, the root being attached to the hub by a spherical abutment and being secured to the lift member, each spherical abutment conferring on each lift assembly a degree of freedom to move relative to the hub about at least a lead-lag axis and a pitch axis, each lift assembly being positioned circumferentially between two adjacent lift assemblies, each lift assembly being connected to the two adjacent lift assemblies respectively by a first damper and by a second damper, and for each lift assembly:
- a first plane contains the lead-lag axis and is orthogonal to the pitch axis of the lift assembly;
- the first damper is hinged to the lift assembly at least about a first axis parallel to the lead-lag axis of the lift assembly;
- the second damper is hinged to the lift assembly at least about a second axis parallel to the lead-lag axis of the lift assembly;
- the first axis is situated in a volume lying between the first plane of the lift assembly and the axis of rotation, the second axis being positioned outside the volume; and
- the root includes a shackle fastened to the spherical abutment and a fitting fastened to the lift assembly between the shackle and the end, the fitting comprising two L-shaped plates, each L-shaped plate presenting an orifice through which the second axis passes, the two L-shaped plates hold between them an intermediate connection member, and the intermediate member including a fork connected to a pitch rod and at least one orifice through which the first axis passes.

18. The rotor according to claim 17, wherein for each lift assembly, a spherical abutment is arranged between the two plates, the spherical abutment comprising an outer abutment member fastened to the two plates and an inner abutment member fastened to the shackle, the inner abutment member being arranged radially between the axis of rotation and the outer abutment member.

* * * * *